United States Patent [19]  [11]  4,155,435

Kimura et al.  [45] May 22, 1979

[54] CURRENT COLLECTING ASSEMBLY

[75] Inventors: Tamisuke Kimura, Kobe; Tomokazu Kashiwara, Nishinomiya; Hiroshi Yoshimoto, Amagasaki, all of Japan

[73] Assignee: Sumitomo Rubber Industries, Ltd., Hyogo, Japan

[21] Appl. No.: 891,641

[22] Filed: Mar. 30, 1978

[30] Foreign Application Priority Data

Mar. 31, 1977 [JP] Japan ................................ 52-37056
Aug. 18, 1977 [JP] Japan ................................ 52-99338
Aug. 18, 1977 [JP] Japan ................................ 52-99339
Oct. 13, 1977 [JP] Japan .............................. 52-122854
Mar. 18, 1978 [JP] Japan .......................... 53-34843[U]

[51] Int. Cl.$^2$ ............................................. B60L 5/36
[52] U.S. Cl. .................................. 191/58; 191/1 R; 191/59.1
[58] Field of Search .................... 191/49, 57, 58, 59.1, 191/1 R; 310/239, 242, 245, 247

[56] References Cited

U.S. PATENT DOCUMENTS 2,481,194  9/1949  Bubb ..................................... 191/57
3,739,108  6/1973  Payen ................................. 191/59.1

Primary Examiner—Trygve M. Blix
Assistant Examiner—Reinhard J. Eisenzopf
Attorney, Agent, or Firm—Birch, Stewart, Kolasch and Birch

[57] ABSTRACT

A device for receiving power from a rigid conductor extending in the direction of advance to an electrically driven, rail vehicle, which comprises current collecting members independently supported on a base through elastic members having a low spring constant, as far as possible, within the working ranges. The current collecting member has a higher predetermined vertical level than the average static height of the rigid conductor so as to be displaced back to the average static level of the rigid conductor. The current collecting member is maintained in a resilient condition during operation so that it is responsive to any sudden changes in pressure and thus prevent separation from the rigid conductor. Supporting members are independently supported on the same base through the elastic members and the supporting members have a vertical level which is equivalent to the average static height of the rigid conductor to be maintained during operation for resiliently supporting the rigid conductor which is partially displaced back.

20 Claims, 15 Drawing Figures

CURRENT COLLECTING ASSEMBLY

BACKGROUND OF THE INVENTION

This invention relates generally to power collection systems and more particularly to novel devices for transmitting power from a rigid conductor to electrically driven, rail vehicles.

A customary approach to collecting relatively heavy currents from a rigid conductor for propelling an electrically operated vehicle, such as a locomotive is to utilize a current collector of pantograph type having an articulated lower structure fixed to the roof of the locomotive and friction bands or shoes and their accessories constituting the actual current collector which are generally linear in configuration for the powers concerned. Although the articulated lower structure generally supports the friction bands through a medium of elastic suspension components so as to enable the current collector to remain in contact with the rigid conductor or the catenary during operation, there is a tendency in the pantograph structure of the prior art to move out of engagement with the rigid conductor and thereby interrupt the flow of current therebetween.

This tendency is accentuated with increasing vehicle speed, where, in addition to the increased relative speed between the engaged conductor and collector members, with the attendant propensity for separation, the aerodynamic force acting on the pantograph also begins to affect its disposition with respect to the rigid conductor.

Difficulties encountered are that all catenaries have certain elasticity due to their constructions and profiles which vary from one conductor to another, where it is necessary that the lift produced by the static force applied by the pantograph, is less at the points of suspension of the conductor than at points near the center of the conductor span, and this variation in lift is proportional to the speed of the locomotive.

Various efforts have been made in order to minimize the disadvantages of the variations in pressure and to maintain the static force applied upwardly by the current collector against the rigid conductor constant as possible. However, all these attempts are limited to the improvements concerning known supporting structures generally referred to as pantographs.

The addition of a single or double action shock absorber to the lower structure so that the actual current collector is supported by the lower structure having the low spring constant characteristics, has led to only mediocre results. If properly devised, the low spring constant characteristics will provide for a "soft shoe" which is flexible to the changes in pressure due to said irregularities of the rigid conductor.

However, on the other hand, friction bands or shoes need to be forced against the rigid conductor with respect to the lower structure with a high average force so as to continue to pickup current correctly and to support rigid conductor partially displaced back by said lift.

It is known to increase the static force by a force of aerodynamic origin. The aerodynamic force depends upon the magnitude of the mass of the articulated system. This method, however, has the disadvantage of simultaneously increasing the lift and deformation of the rigid conductor.

Simultaneous accomplishments of actual current collecting without disruption, and supporting the rigid conductor with the current collector of the pantograph type are apparently not expected, since such collector is constructed to have the means for collecting current and the means for supporting said means in series, whereby the art to provide a high average force against the contact conductor for supporting the rigid conductor while retaining the desired low spring constant within the working range for being flexible to the changes in pressure, is substantially not possible.

In a different way, even various modifications, to the conductor concerned have been attempted. Recently, it is found that rigid conductor is so effective for the super high speed locomotive that it is employed as a substitute for the ordinary catenary wire.

However, all of these modifications, even if applied simultaneously, do not permit satisfactory current collection especially for high speed locomotive, as long as the substantial mechanical defects mentioned above of the pantograph type remain.

Recently, increasing public nuisance produced by noise and sparks and a second problem caused by poor current collection and loss of contact accompanied by arcing has become a serious matter to be considered.

In order to minimize the disadvantages mentioned above, although much attention has been given to the improvement of the material used, especially for the actual current collecting portion or the shoe, these materials remain unsuccessful, mainly depending upon the fact that the elastic suspension of the shoe is still too "stiff".

Accordingly, an essential object of the present invention is to provide a current collecting assembly including the art for transmitting power from the rigid conductor to electrically driven, rail vehicles, which can substantially provide an average force against the rigid conductor to support the rigid conductor partially displaced back while retaining the spring constant as low as possible within desired working ranges to properly pick up current.

Another important object of the present invention is to provide a current collecting assembly of the above described type which is accompanied by improvements in the material used for the actual contact portions of said devices to maintain the working duration of said devices as long as possible and to prevent the public nuisance caused by loss of contact between the wire and current collecting assembly.

A further object of the present invention is to provide a current collecting assembly of the above described type accompanied with the above mentioned improvements on the material which are simple to fabricate, ecconomical to operate and extremely functional in use.

BRIEF SUMMARY OF THE INVENTION

In accomplishing these and other objects in accordance with one aspect of the present invention, there is provided a device for transmitting power from rigid conductor extending along the longitudinal direction of travel to electrically driven, rail vehicle, which comprises the current collecting means composed of a plurality of the current collecting members serving as actual current collectors, and arranged to space from each other in the longitudinal direction of the rigid conductor while each laterally extending and supported on a base through a pair of resilient members, and the supporting means composed of a pair of the supporting members to provide an average force against said rigid conductor during operation, both said members being interposed by said current collecting means therebetween while each laterally extending and independently supported on said base through a resilient member having relatively high spring constant characteristics when compared with that of the current collecting means.

Furthermore, each of the means is arranged to be upwardly extended from the base so as to be high enough to maintain frictional engagement with the rigid conductor during operation, while the current collecting means is adapted to be slightly higher than the height of the supporting means having the mean static height of the rigid conductor so that the substantial height or level of engagements of these two means with the rigid conductor is approximately kept at the level of the mean static height of the rigid conductor as well as the current collecting means is to remain under the resilient condition owing to its downward displacement during operation due to the low spring characteristics and said predetermined higher level of the resilient members of said means.

By the arrangement mentioned above, the device of the present invention comprises two means in parallel on the same base, one means of which can provide the average force against the rigid conductor with respect to the base owing to its specifically higher spring constant characteristics compared with that of the current collecting means, while the current collecting means is constantly retained under same resilient condition and thereby, capable of collecting current under quite flexible condition for further changes in pressure due to irregularities of the rigid conductor owing to its quite low spring constant characteristics.

Electrically, each said current collecting members made of iron or the like transmits current from the rigid conductor through flexible leading wires exposed in the open air via the base made of good electrically conductive material which is electrically connected to the vehicle propulsion system and insulated from the vehicle superstructure. However, on the contrary to the embodiment mentioned above, the base is not restricted to be made of good electrically conductive material and may be made of hard resin while having leading wires of electricity therein.

Furthermore, each current collecting element is connected therebetween by flexible leading wires, and thus a whole circuit for transmitting current is constituted with including said leading wires.

Accompanied with these novel construction of the device of the present invention for transmitting the current from the rigid conductor, material concerned, especially for the supporting portions of the supporting means is improved, characterizing its high resistance to abrasion and yet having relatively low friction factor, whereby the device of the present invention will maintain the long working duration and prevent the public nuisance that would otherwise occur by loss of contact due to the abrasion concerned.

BRIEF DESCRIPTION OF THE DRAWINGS

These and other objects and features of the present invention will become apparent from the following description taken in conjunction with the preferred embodiment thereof with reference to the accompanying drawings in which.

Before the description of the present invention proceeds, it is to be noted that like parts are designated by like reference numerals throughout several views of the accompanying drawings.

DETAILED DESCRIPTION OF THE INVENTION

Figure 1:
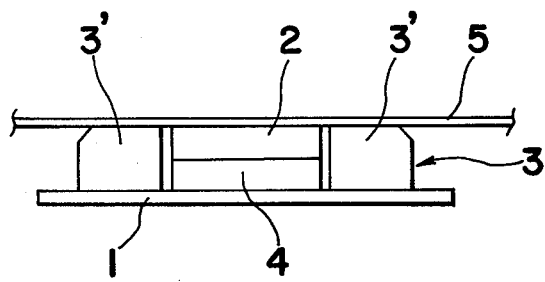
FIG. 1 shows a partial side view in section of an embodiment of the device according to the present invention.
Figure 2:
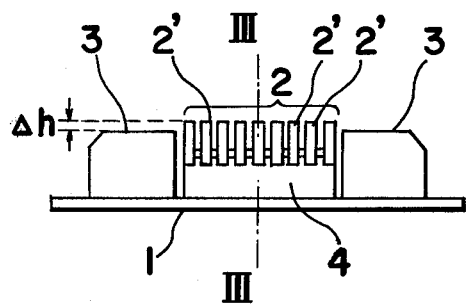
FIG. 2 shows a partial side view in section of a modified embodiment of the device according to the present invention.
Figure 3:
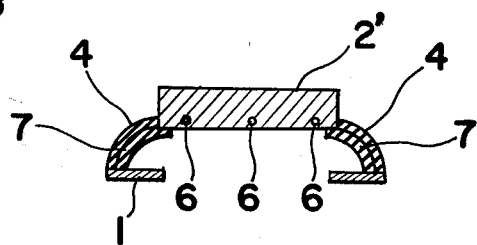
FIG. 3 shows a cross section taken along the line III—III of FIG. 2.

Referring now to the drawings, there are shown in FIGS. 1 to 3 preferred embodiments of the present invention, in which a device for transmitting power from rigid conductor extending along the longitudinal direction of travel to electrically driven, rail vehicles, comprises current collecting means serving as the actual current collector and supporting means assisting in picking up current correctly, only the current collecting means being supported by elastic members while both means are mounted on the same base which is electrically connected to the vehicle propulsion system and insulated from the vehicle superstructure.

As is shown in FIGS. 1 and 2, the supporting means 3 includes a pair of spaced supporting members 3' mounted on a substantially horizontal plane of a base 1, with electrical current collecting means 2 interposed between said supporting members. The electrical current collecting means 2 may be a single current collecting element as shown in FIG. 1, or may be formed by a plurality of current collecting elements 2' arranged side by side in spaced relation from each other in the longitudinal direction of the rigid conductor 5. It is to be noted here that the number of the elements 2' is not critical to this invention, nor is the number of the supporting members 3' thereof. What are shown in FIGS. 1 and 2 are typical arrangements.

Each of the means 2 and 3 upwardly extends from the base 1, so as to be high enough to maintain frictional engagement with a rigid conductor 5 during operation, while the current collecting means 2 as a whole is slightly higher than the height of the pair of the supporting members 3' positioned near opposite sides thereof.

The feature and the effects of the difference in height between the two means denoted by $\Delta h$ in FIG. 2 will be described in details hereinbelow.

The details of the current collecting means 2 is shown in FIGS. 2 and 3, wherein each of the elements 2' made of electrically conductive material such as iron and the like which is selected from and depends upon materials of the overhead rigid conductor, and having a rectangular configuration in cross section, is fixedly supported at opposite ends thereof to the single elastic member 4. The elastic member 4 is made of rubber or the like, and sometimes is assembled in a precompression condition in accordance with a predetermined range of resiliency, said elements 2' being positioned in spaced relation from each other to provide a broad area with which the rigid conductor 5 can maintain frictional and electrical contact. The rubber or the like may be replaced by a bound spring, only if this has a relatively low spring constant, in order to be responsive to the changes in pressure due to variation and irregularities of the rigid conductor 5 with respect to the base 1 on which this member 4 is mounted. The understructure on which the base is mounted will be disclosed in connection with FIG. 10 and its descriptions.

The construction of the element 2' is best understood by reference to FIG. 3, which shows each element 2' mounted on the same base 1 by the elastic member 4 at the lateral end thereof. The number of segments of the elastic member 4 is not critical to this invention nor is the geometric arrangement thereof. However, it is important that a desired spring constant be provided, as will be more fully explained hereinbelow. What is shown in FIG. 3 is a typical arrangement wherein a pair of rubber sheets 4 are framed by leading wires 7.

Electrically, each of said current collecting elements 2' transmits current from the rigid conductor 5 through flexible leading wires 7 accommodated inside said rubber sheets 4 via the base 1 to the vehicle propulsion system (not shown). The base 1 is made of a good electrically conductive material.

Furthermore, each of the current collecting elements 2' is connected therebetween by flexible leading wires 6 which, on the other hand, are adapted to position said elements 2' in parallel relation with a certain space to the other, where a whole circuit for conveying current is constituted when including said lead wires 7. In the preferred embodiment, said circuit is not necessarily composed of a single conductor wire, and thus the spring constant required can be adjusted in advance by varying the number or the diameter of the wires accommodated in the rubber body 4.

As shown in FIG. 1, the pair of the supporting members 3' are each fixedly mounted on the base 1, each one of which laterally extends at the longitudinal ends of the base 1, with the current collecting means 2 being interposed therebetween. The means 3 of this embodiment is made of either a single synthetic material or a fiber reinforced plaster characterized in high resistance to abrasion and yet having relatively low friction factors, said single synthetic material including nylon, teflon, or a polycarbonate. In the place of those materials mentioned above, powder carbon or a molybdenum disulfide filled synthetic such as molybdenum disulfide filled nylon, or powder carbon or molybdenum disulfide filled metallic compounds can be used for the same purposes. Furthermore, said body made of synthetic material can be reinforced by conventional metallic plate which is embedded in the synthetic material and extends from the top surface thereof where it is exposed for frictional contact with the rigid conductor.

These far, in the embodiments shown in FIGS. 1 to 3, the supporting means 3 mounted on the base 1, has no elastic member for its understructure. However, in the following embodiments, the supporting means 3 will be provided with an elastic member for its understructure.

By the arrangements mentioned in the foregoing, the device will comprise two mechanical means 2 and 3 positioned in parallel on the same base 1. Hence, the supporting means 3 can provide a high average force against the rigid conductor 5 with respect to the base 1 while the current collecting means 2 is capable of providing for slight deviations of contact due to the rigid conductor irregularities, and still maintain mutual contact due to its specific low spring constant. The above is true if the substantial height or level of engagements of these two means 2 and 3 with the rigid conductor 5 is maintained the same with respect to the base 1 during operation and furthermore, the means 2 is maintained under a resilient state.

The difference in substantial height denoted as $\Delta h$ in FIG. 2 between the current collecting means and the supporting means mentioned in the foregoing is arranged in a manner such that the difference $\Delta h$ accompanied with the difference in resiliency between said means mentioned above 2 and 3, can lead to said preferred condition for current transmission for this device. Thus the supporting means 3 will keep its predetermined height of the static height of the rigid conductor 5 almost unchanged during operation, while the original higher level noted as $\Delta h$ of the current collecting means 2, having a relatively low spring constant, is displaced back by the increment $\Delta h$, and reduced to approximately the same level as the supporting means 3 and thereby, the means 2 retains the resilient state.

The course of experimental works on separation tests, abrasion tests and noise tests associated with the present invention showed good improvements when compared with the results shown by the prior art conducted at the same time as mentioned hereinbelow.

Results of the abrasion tests used in the devices shown in FIG. 2, and its less modified type according to the present invention, and a device having almost same construction of the pantograph type for transmitting current from the rigid conductor respectively are shown in Table 1. In Table 1, A denotes said conventional device provided with the current collecting portion made of sintered copper which is the most popular material in the prior art, B denotes a device comprising the current collecting means made of sintered copper, and the supporting means made of nylon 66 resin reinforced by carbon fiber (C.F.R.T.P.), each means being independently positioned on the same base, and C denotes the device of the present invention shown in FIG. 2. The device according to the present invention as shown in FIG. 2, comprises the supporting means made of nylon 66 resin reinforced by carbon fiber (C.F.R.T.R.), having a spring constant of 48.6 kg, Force/mm under a compression of 5 kg Force, and the current collecting means is composed of elements made of brass which are supported on the base through the elastic members having a spring constant of 0.4 kg Force/mm under a resilient condition caused by its downward displacement of 0.4 mm (or Δh) mentioned hereinabove. Other experimental conditions are as follows.

TABLE 1

| Device used | Abrasion in depth of the trolly wire used (mm/running distance 1,000 km) | Abrasion in volume of the current collecting portion (mm³/running distance 1,000 km) |
|---|---|---|
| A | 0.580 | 37,500 |
| B | 0.099 | 5,295 |
| C | 0.008 | 1,656 |

Experimental conditions;

| | |
|---|---|
| The conductor for current supply | Rigid conductor made of hard copper having a cross section of 110 mm² |
| An average force against the rigid conductor for frictional contact and its supporting means | 5 kg Force and a number of pneumatic-cylinders |
| Lateral vibration of frictional contact related to the longitudinal direction of travel | 1 Hz/±15 mm |
| Travelling velocity for tests | 52 km/hr |
| The current for being transmitted | AC 200A |

It is evident from the results listed in Table 1 that even the device B shows quite high resistance to abrasion during operation while its current collecting portion is made of the same material as that for the device A. The results obtained show that abrasion concerned with said device, according to the present invention, is quite low both for said portion of the device itself and for the rigid conductor which is to be engaged therewith.

Tables 2 and 3 show the results of both following capability tests and tests of noise level accompanied with said separation. The following capability tests were undertaken by the conventional method of following capability tests. Other experimental conditions are as follows.

TABLE 2

| | Proportion of following capability (%) | | | |
|---|---|---|---|---|
| Device used | 52 km/h | 65 km/h | 78 km/h | 91 km/h |
| A | 4.2 | 9.7 | 35.1 | 69.1 |
| C | 0 | 0 | 3.9 | 6.7 |

TABLE 3

| Device used | Overall noise level (A characteristics, dB) |
|---|---|
| A | 92 |
| B | 86 |
| C | 83 |

Experimental conditions;

| | |
|---|---|
| The conductor for current supply | same as used for the abrasion tests |
| An average force against the rigid conductor for frictional contact and its supporting means | 5 kg Force and a number of penumatic-cylinders |
| Lateral vibration of frictional contact related to the longitudinal direction of travel | 1Hz/±15 mm |
| The location of the microphone | 0.5 m above the ground and 0.5 m forward the device in position |
| Travelling velocity for tests | 52 (only for separation tests), 65, 78, 91 km/h |

TABLE 3-continued

| | |
|---|---|
| The background noise | 77 dB |

The results obtained show that both following capability and noise characteristics concerned with said device, according to the present invention, are quite good and therefore, poor current collection and loss of contact accompanied by arcing will be prevented.

The Table 4 shows the results of further abrasion tests, where each supporting means made of said material is also supported on the base through the elastic member as well, while said supporting means shown in FIG. 2 is not supported through the elastic member. However, the supporting means, even when it is supported on the base through the elastic members, should be arranged to be characterized by its apparently high spring constant as a whole when compared with that of the current collecting element, to provide said difference in resiliency between said two means. Other experimental conditions are the same as those mentioned in said abrasion tests.

TABLE 4

| Abrasion in volume (mm³/1,000 km) | | |
|---|---|---|
| Without the elastic member | With the elastic member | A/B ratio |
| 2,805 | 1,200 | 2.3 |

The results show good improvements on abrasion when considering the device according to the present invention. As mentioned in the foregoing, abrasion characteristics, noise characteristics, and following capability characteristics of the device according to the present invention are quite favorable and thus, this device will favorably contribute to the art for transmitting the current from the rigid conductor to an electrically driven, vehicle.

Figure 4:
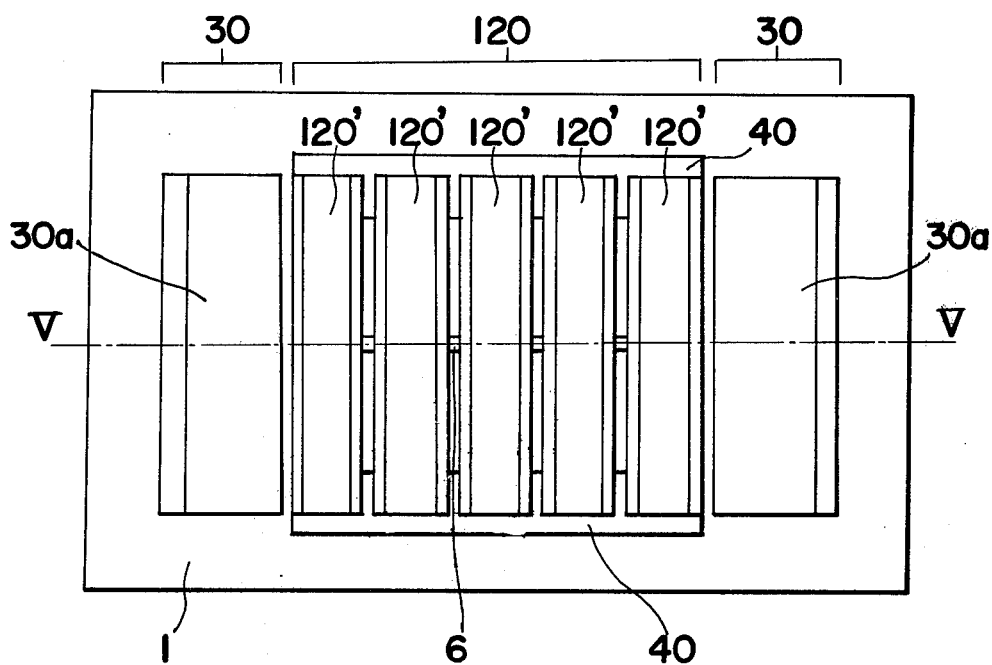
FIG. 4 shows a partial top plain view of a modified embodiment of the device according to the present invention.
Figure 5:
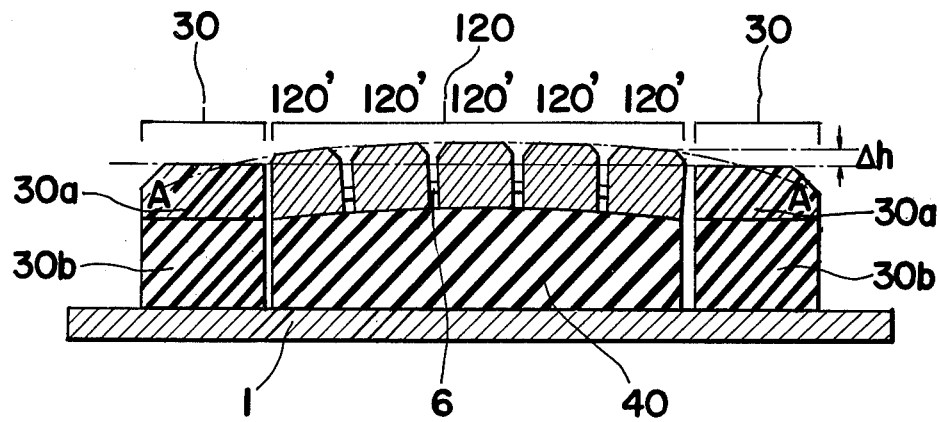
FIG. 5 shows a cross section taken along the line V—V of FIG. 4.

FIGS. 4 and 5 show a modified embodiment concerned with the average level of the plurality of current collecting elements shown in FIGS. 1 and 2, wherein the substantial upper side face of the elastic member 40 is arranged to present an upwardly curved profile in the longitudinal direction of travel so that the substantially continuous upper side surface of the plurality of the current collecting elements 120' longitudinally disposed on elastic member 40, denoted as curve A—A' in FIG. 5, may provide a converse catenary profile having its maximum point at the longitudinal center of the current collecting means 120 extending in the same direction. The average level of this means 120 is higher than that of supporting means 30 to achieve the effect mentioned hereinabove.

The rigid conductor 5 for supplying current to the electrically driven vehicle (not shown) has a number of joinning portions for constituting a long conductor, and in turn, these joinning portions produce irregularities in the longitudinal surface thereof. The arrangement showing the profile of the present invention is devised to make the upper side surface of the current collecting means 120 adapt to this type of wire suspension, whereby poor current collection or loss of contact accompanied by arcing due to the irregularities of rigid conductor can be avoided in a manner mentioned hereinbelow.

Even if the forward periphery of certain elements 120, disposed along said profile with respect to said member 40, encounters said irregularities and is thereby pushed back by the momentum caused by the interruption of the relative velocity between the rigid conductor and the vehicle or the locomotive, the subsequently disposed elements resiliently supported along the upper side surface defined in said curve of the same member 40 will be conversely push forward to maintain mutual contact in the longitudinal direction of travel by the force resulting from the counteraction of the momentum accompanied by the effects caused only by said arrangements. The subsequent elements, having the engaging level shown in FIGS. 1 and 2, are pushed back to reduce said disadvantages.

As shown in FIG. 5, the supporting means is composed of a sliding board 30a made of said material mounted on a resilient member 30b which is made of rubber and the like, the construction of which was introduced from the experimental results mentioned above.

All of the effects mentioned above have already been confirmed by experimentation under actual working conditions.

FIG. 6 to FIG. 9, show another modified embodiment concerning the current collecting means 200 and its elastic members 400, wherein each current collecting element is resiliently supported by a pair of elastic assemblies 44 assembled from a elastic rubber 8 including its accessories, and a pair of leading wires 7 of wire fabric or the like. These wires are mainly utilized to conduct the current to the base 1.

Figure 6:
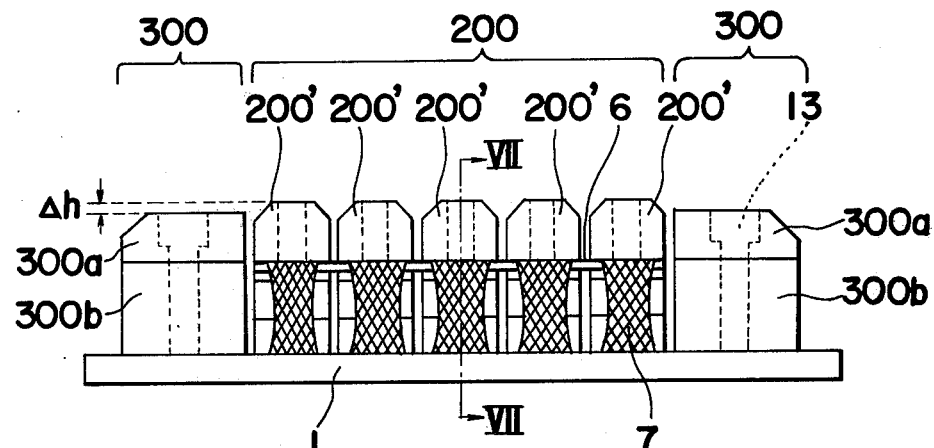
FIG. 6 shows a partial side view of a modified embodiment of the device according to the present invention.
Figure 7:
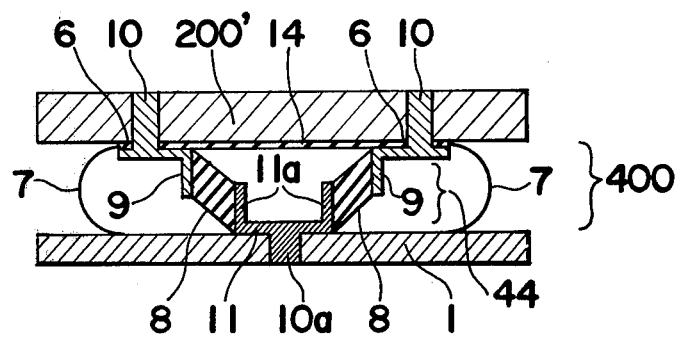
FIG. 7 shows a cross section taken along the line VII—VII of FIG. 6.

FIGS. 6 and 7 show the detail structure of the current collecting means 200, wherein the current collecting means are divided into a number of independent current collecting elements 200' fastened to respective elastic members 400, said elements 200' being conducted by flexible leading wires 6 therebetween. Specifically, each of the current collecting elements 200', which is longitudinally spaced and laterally extending, is resiliently interconnected by a pair of said leading wires 7 assembled in a precompressed condition and the pair of elastic assemblies 44, wherein each lateral bottom end of the element 200' is fastened to one outer side of an L-shaped member 9 positioned underside thereof with a bolt 10, while one substantial higher end of a rubber sheet 14 covered with wire netting 15 and the upper end of said leading wire 7 under said condition interpose or which, in turn, are intervened between said end of the element 200 and said side of the member 9. The other side of the L-shaped member 9 inwardly positioned and downwardly extending with respect to said side, to which one face of substantially parallel faces of an elastic rubber body 8 defined in a parallelogram in cross section and being inwardly extended is fixed while the other face of said body 8 is also fixed to either of the outer surface of parallel walls 11a of a U-shaped member 11 centrally fastened to the base 1 with a bolt 10a and also intervening the other end of the leading wires 7.

Abovementioned construction of the pair of elastic assemblies 44 constitutes a converse triangle as shown in FIG. 7, by which arrangement vibrant fluctuations of three dimensional pressure exerting on the top surface of the current collecting element 200' due to irregularities of the rigid conductor 5 during operation is downwardly transferred and thereby resiliently absorbed both by elastic sheering deformation of the elastic rubber body 8 and downward displacement of said leading wires 7 assembled in a manner mentioned above with respect to the base 1.

As mentioned above, each current collecting element 200' is independently provided with the elastic member 400, though all of the elements 200' are fixed on the same base 1 and electrically connected by flexible leading wires 6 therebetween as mentioned in the foregoings. However, in this embodiment, said leading wires 7 are exposed in the open air, and not accommodated in the elastic rubber body 8 of the elastic assemblies 44, such a manner of which will prevent the joule heat from generating within the elastic member body and thereby, the unified spring constant of the elastic constant of the elastic member 400 remains constant.

The supporting means 300 is composed of a sliding board 300a mounted on a resilient member 300b, both of which are fastened to said same base 1 with bolts 13. In this embodiment, the sliding board 300a is made of synthetic resin material having low resistance for friction and high resistance for wear, while the resilient member 300b is made of material having much higher spring constant compared with the material used for the elastic rubber body 8 in the elastic assemblies 44 of the current collecting element 200'.

Figure 8:
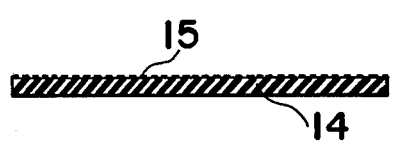
FIG. 8 shows a rubber sheet in section used in the embodiment of FIG. 6 on an enlarged scale.

FIG. 8 shows the rubber sheet 14 to be intervened in a manner mentioned above in order to avoid noise due to sliding action of the element 200' on the rigid conductor to be transferred when the device is in operation. Furthermore, one side face of the rubber sheet 14 is covered with wire-netting 15 and this face is to be faced to the lowest side surface of the current collecting elements 200' when assembled, whereby smouldering combustion of the rubber sheet 14 spontaneously ignited by undesirable electric sparks due to separation of the contact is to be prevented.

Figure 9:
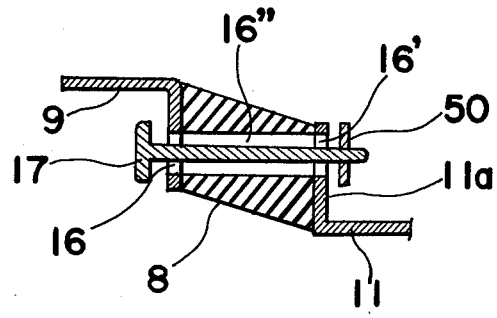
FIG. 9 shows a partially modified embodiment shown in FIGS. 6 and 7 in section on an enlarged scale.

FIG. 9 shows another modified embodiment for interposing the elastic rubber body 8, wherein a safety pin 17 extends through hole 16" formed in the elastic rubber body 8 and those 16, 16' of its sides, and is attached to the member 11a by a stopper 50. This arrangement is to be prepared for safety purposes in order that the metallic current collecting element 200' will not cause any problems when the elastic assemblies 44 is corrupted and dissembled.

Figure 10:
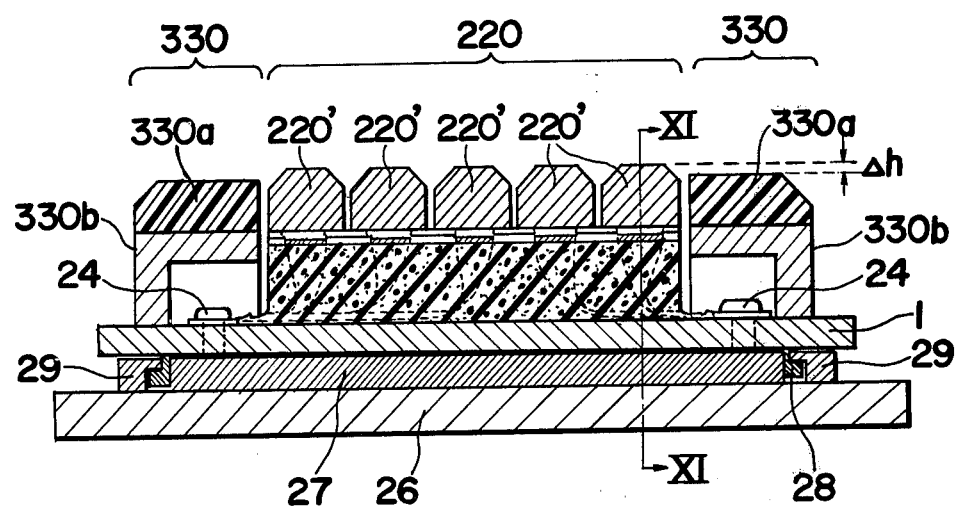
FIG. 10 shows a side view in section of a modified embodiment of the device according to the present invention.
Figure 11:
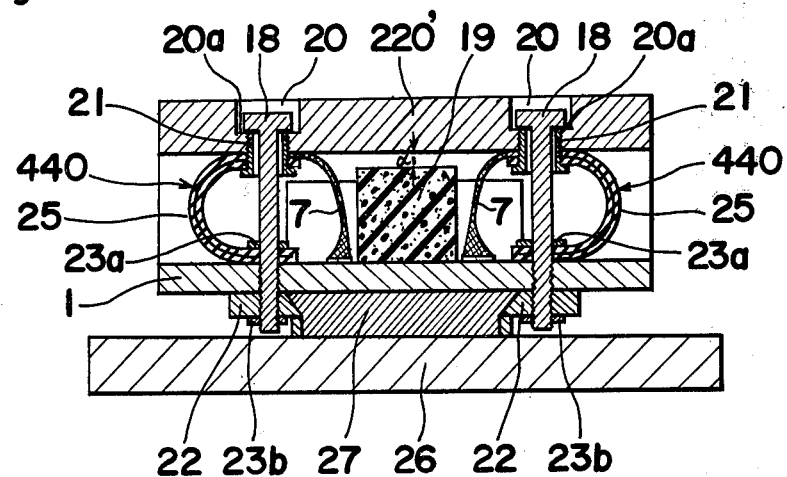
FIG. 11 shows a cross section taken along the line XI—XI of FIG. 10.

Other modified embodiment mainly concerned with the current collecting means of the present invention is disclosed in FIGS. 10 and 11.

Similarly, a device shown in FIG. 10 for conducting current to electric vehicle (not shown) from the rigid conductor comprises current collecting means 220 and supporting means 330, each means of which is supported by its own elastic or resilient member respectively as described in the foregoings, but modifications are applied for concerning the shock-absorbing mechanism and its related parts of the current collecting elements as mentioned hereinbelow.

In this embodiment shown in FIGS. 10 and 11, the current collecting means 220 comprises a number of the current collecting elements 220' positioned in a manner mentioned above, each longitudinal end of which is held by a resilient member to interconnect it to the base 1 by a pin 18 fastened to the base 1, said resilient member 440 having a cross sectional configuration defined in outwardly curved arc in a lateral direction of travel to flexibly support said longitudinal end momentarily borne back when said element 220 is in operation, and a elastic body 19 working as the second stage resilient member when said element 220' is excessively displaced back and is lowered beyond the predetermined limit in displacement to be supported by said resilient member 440.

Referring to FIGS. 10 and 11, the current collecting elements 220' has two spot facing parts 20 thereon, each one of which is located on each longitudinal end of upper portion of the element 220' while its bottom end being arranged to fit and connect to an end surface of tapped hole opened from the other side surface of the current collecting element 220'. An outwardly screwed bushing 21 is conversely attached to the tapped hole, intervening both one end of a leading wires 7 of wire fabrics and one end of the resilient member 440 between its lip and the bottom surface of the element 220'. In the spot facing 20 and its forward connected aperture of the bushing 21, the pin 18 having a smaller diameter than that of the aperture of the bushing 21 is inserted, resting its lip on a shoulder 20a of the spot facing 20.

The other end of the pin 18 extending through the bottom opening on the resilient member 220' and both tapped holes of the base 1 and a guiding plate 22 is to be double locked by a pair of nuts 23a and 23b to prevent the loss of predetermined resilient condition of the assemblies.

The current collecting element 220' is thus to be removable mounted with respect to either the base 1 or the pin 18 in connection with the further mechanism mentioned hereinbelow so as to allow the pin 18 fastened to the base 1 to be resiliently engaged with the element 220'. The both substantially longitudinal ends of the resilient member made of a precompressed rubber sheet framed by flexible cord for this embodiment are fastened both to every said current collecting element 220' and to the base 1 so as to interconnect between them in a manner such that the cross section of the rubber sheet outwardly curved, presenting outwardly curved arc, may integrally work as the resilient member of the current collecting means as a whole, whereby the current collecting element flexibly shouldered by the pair of ends of said rubber sheets will spring back till the lip of the pin 18 faces on the upper surface of the shoulder, and thereby, is stopped, after the fluctuation of the pressure due to the irregularities of the rigid conductor is exerted to the upper face of the current collecting element 220'. The one end of the above mentioned leading wires 7 is attached to the base 1 with a bolt 24, being intervened by the head of the bolt 24 and the upper surface of the base 1, where more than one of said ends may be simultaneously attached to the upper surface of the base 1 as shown in FIG. 10.

In this embodiment, the elastic rubber sheet 440 is framed by the steel cord 25 run inside thereof in only one direction as shown in FIG. 11, i.e. the substantially longitudinal direction of the rubber sheet when applied for the device, but, for the other modified embodiments, the rubber sheets framed horizontally as well as in two directions may applied for. When the elastic rubber sheet framed in two directions is used for as the resilient member, this sheet may be applied in a manner such that it inclines from the substantially perpendicular direction positioning between the bottom side surface of the current collecting element 220' and the upper side surface of the base 1.

Furthermore, although in this embodiment, the pair of single elastic rubber sheets 440 are equipped to the device as a whole in order to integrally work as the combined resilient member 440, this elastic sheet can be divided into parts to have each current collecting element be independently provided with its own elastic rubber sheet as the first shock-absorbing mechanism.

FIG. 11 also shows a shock-absorbing body 19 which will work as the second stage resilient member when the current collecting element is excessively depressed and is lowed beyond the predetermined limit in displacement denoted $a_1$ in FIG. 11 to be supported by said resilient member. As shown in FIG. 11, shock-absorbing body made of expandable rubber material 19 is centrally situated on the base 1, extending in the same direction of the rigid conductor.

The body 19 having a predetermined height from the base 1 for abovementioned purpose is not also necessarily formed in a single body as shown in FIG. 11, but can be divided into a certain number of blocks having said height. In the place of the abovementioned embodiment, there can be provided two lines of the cushioning, expandable bodies or of the number of said blocks symmetrically positioned while both interposed between the pins 18. On the contrary to this disposition of this cushioning body mentioned above, the body may be fitted to the base 1 with the pin 18 itself, wherein the pin extends through the body and make it fixed by ordinary manner and thus the two resilient members present a directly combined shock-absorbing mechanism.

Furthermore, in the place of this cushioning, shock-absorbing body, a spring of a certain fixed spring constant may be available, binding around the pin 18 and the bottom end of which is fastened to the base 1 by means of the nut. It should be noted that any form of an elastic medium may be used for as the second stage shock-absorber, only if the medium has a certain predetermined spring constant, regardless of its disposition on the base and its total sliced numbers as mentioned above. However, the height difference between the first and the second resilient members, denoted by $a1$ in FIG. 11, must be provided for in advance, so that the momentarily downward pressure excessively caused by the rigid conductor due to its local irregularities, may be shock-absorbed through two stage shock-absorbing mechanism as mentioned in the foregoings, where the external, downward pressure due to said origin firstly distorts the first resilient member, causing the axial backward displacement which is equivalent to the difference denoted by $a_1$ and thereby, excessive portion thereof will still distort the secondstage to be double shock-absorbed with the second resilient member 19.

The base may be mounted on the locomotive by means of a board 26 horizontally spread on the roof of the locomotive (not shown) as shown in FIGS. 10 and 11, wherein each inner surface of two guiding layers 22, each one of which is inwardly slanted and symmetrically positioned on the bottom surface of the base with respect to the longitudinal direction of the locomotive, contacts with one of the outer surfaces of a guiding rail 27 centrally mounted on the board 26 for engagement, while each longitudinal ends of the guiding plates or layers 22 is laterally fixed to the board 26 through the engagement between downwardly stepped portions 28 of said longitudinal ends of the guiding boards and their complementarily recessed members 29 made of metal projected from upper side surface of the board 26.

By the arrangements for the modified embodiment of the present invention shown in FIGS. 9 and 10, the double shock-absorbing mechanism of the resilient member for the current collecting means characterize its first and second shock-absorbing mechanism, wherein not only the resiliency of the first made of rubber framed by the steel cord is adjustable with respect to the base by means of said nuts 23a and 23b, and thereby possible to have the lowest spring constant within the working range so that the first member may be responsive to any slight fluctuations of the external pressure to prevent separation that would otherwise occur at high speeds, but the second member can work so as to continue to pickup current correctly when said first member is compressed beyond the predetermined limit in displacement.

Furthermore, the structure characteristics comprising pins to support the actual current collecting element on the movable condition to any direction and the cushioning, shock-absorbing body to compensate the excess motion of said current collecting element, will resiliently limit the motions of both said element and said rubber themselves in a moderate manner, whereby not only the working durations of both said rubber and said element are improved, but the dangerous destruction of said rubber and its accessories is prevented.

Furthermore, the public nuisance caused by noisy and unsteady contact of shoe and the rigid conductor associated with the prior art is avoided according to the present shock-absorbing mechanism provided with quite a low spring constant within the working range accompanied with improvements on material used for the actual current collecting portion.

Figure 12:
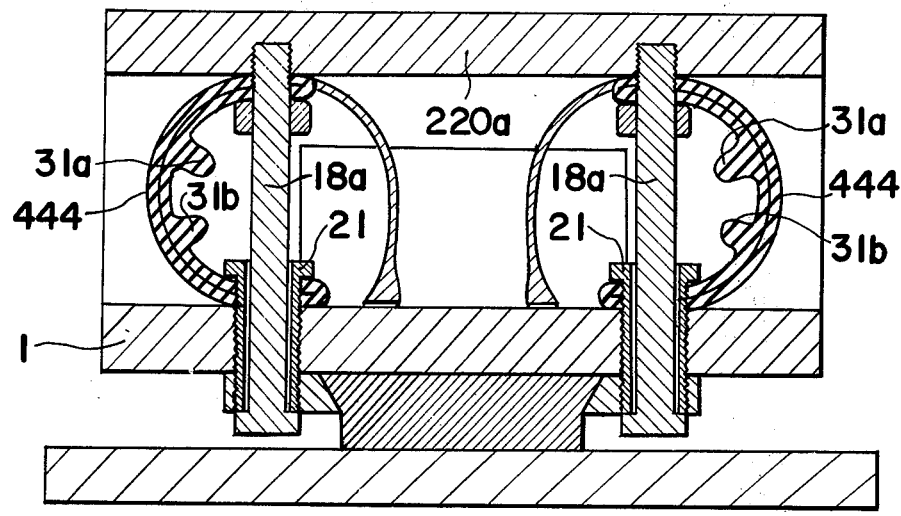
FIG. 12 shows a partial side view in section of a modified embodiment of the device according to the present invention.

FIG. 12 shows the modified embodiment concerning said double shock-absorbing mechanism. As shown in FIG. 12, a pair of layers 31a and 31b projects from the inner surface of the rubber sheet 444 of the type mentioned in the foregoings, both longitudinally extending in the direction of travel while each positioning near to the rest to contact with each other when the rubber is inwardly compressed beyond a certain, predetermined limit, while the expandable body 19 of FIG. 11 is eliminated in this embodiment. In the place of said layers 31a and 31b, portions projected from said surface may present the same effects.

Furthermore, in this embodiment, the shock-absorbing mechanism shown in FIG. 12 is improved by modifying the assembling art thereof, where the current collecting element 220a is resiliently interconnected to the base 1 by means of the rubber sheets 444 having a predetermined resilient condition as mentioned in the foregoings and pins conversely having one end fastened to the current collecting element 220a and thus its lip or shoulder is stopped by the bottom surface of the base 1 and yet having the same mechanical characteristics in a manner mentioned in the foregoing embodiment shown in FIGS. 10 and 11. Material used for the pin used for this embodiment 18a is the same to that used for the current collecting element 220a, and the upper end of this pin 18a outwardly tapped is slightly extended inside the element 220a.

When the supporting means mentioned in FIG. 11 is secured to the base 1 by bolt substantially downwardly passing therethrough, the fastening method should be followed in a manner such that the head of bolt may stopped by the bottom outer side of the guiding board as well.

Figure 13:
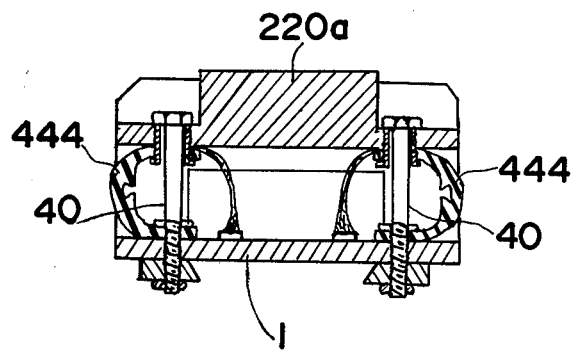
FIG. 13 shows a partial side view in section of a modified embodiment concerning a mounting method of a current collecting member according to the present invention.
Figure 14:
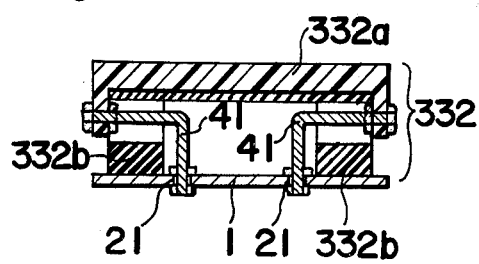
FIG. 14 shows a partial side view in section of a modified embodiment concerning a mounting method of a supporting member according to the present invention.
Figure 15:
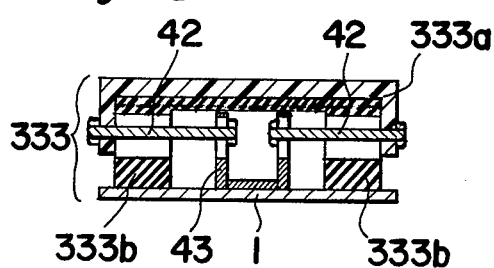
FIG. 15 shows a partial side view in section of another modified embodiment concerning a mounting method of a supporting member according to the present invention.

Furthermore, prevent the public nuisance caused by abrasion, the method of securing the supporting member and the current collecting member to the base is modified as shown through FIGS. 13 to FIG. 15. FIG. 13 shows an embodiment, wherein the current collecting element 220a of the current collecting member has outwardly stepped portion at each lateral end thereof, which is equivalent to a spot facing for a bolt 40 for resiliently securing the current collecting element 220a to the base 1 as mentioned in the foregoing so that the head of the fastening bolt 40 will remain untouched with the rigid conductor by this arrangement in order to prevent poor current transmitting as well as the public nuisance due to irregularities of contacting surface caused by abrasion which will otherwise occur.

FIG. 14 shows an another embodiment concerned the method of securing the supporting member to the base 1, wherein the upper portion of a supporting member 332a has a pair of wall downwardly extending at the both ends thereof respectively to permit one top end of an L-shaped bolt 41 interconnecting the supporting member and the base 1 to be secured, while the other end extending via the blank portion of an elastic member 332b positioned between a sliding board 332a and the base 1 through a bushing 21 in the base 1, with its downward end having a nut functioning as a stop as mentioned in the foregoings.

FIG. 15 shows a still further embodiment, wherein a sliding board 333a of a supporting member 333 also has a pair of wall downwardly extending at the both end thereof respectively to permit one top end of a straight bolt 42 to be secured thereto, while the other end extending via the blank portion of an elastic member 333b through the bigger aperture in the side wall of a converse U-shaped member 43 centrally positioned on the base 1 is stopped by a nut, whereby the straight bolt 42 is vertically movable with respect to the base 1.

By the arrangement mentioned above, the head of the bolt positioned much lower level would not cause any contact with the rigid conductor during operation and thus poor current collecting accompanied with separation is prevented.

By the arrangement mentioned in the foregoings, when these layers 31a and 31b or projected portions come to contact as the rubber 444 with a predetermined low spring constant as mentioned in the foregoings is to be successively compressed beyond a certain, predetermined limit due to the excessive variation of contact pressure, the specific spring constant of said rubber 444 as a whole will be suddenly increased by the mutual interaction between the layers 31a and 31b themselves and then, successive depression due to said reason is resiliently held or limited, whereby said layer provided is served as a second stage shock-absorber. Furthermore, owing to both said converse construction and improvements on material concerning the pin, even heavy abrasion of the surface of the upper side surface reaches the leading edge of the pin as shown, there will not be caused any problems that would otherwise occur in the device described in FIGS. 10 and 11 at high speeds.

Although the present invention has been fully described by way of examples with reference to the attached drawings, it is to be noted that various changes and modifications are apparent to those skilled in the art. Therefore, unless otherwise noted, such changes and modifications depart from the scope of the invention, they should be construed as included therein.

What is claimed is:
1. A current collecting assembly of the sliding type having improved resistance against abrasion for receiving electrical power from a continuous rigid conductor and transferring it to an electrical vehicle for the propulsion of said electrical vehicle, said current collecting assembly comprising;

a base adapted to be secured to the electrical vehicle and electrically connected to the vehicle propulsion system of said electrical vehicle and electrically insulated from the vehicle structure, a current collecting member mounted on said base and provided with a spring constant sufficient to establish contacting relationship with respect to said rigid conductor at all times, and a load supporting member mounted on said base, independent of said current collecting member, and adapted to engage the rigid conductor upon contact under pressure of said rigid conductor with said load supporting member said load supporting member being provided with a spring constant larger than the spring constant of said current collecting member, at least a part of said current collecting surface and said load supporting member being composed of material having high abrasion resistance with low friction.

2. A current collecting assembly of the sliding type having improved resistance against abrasion for supplying electrical power from a continuous rigid conductor to an electrical vehicle for the propulsion of said electrical vehicle, said current collecting assembly comprising;

a base adapted to be secured to the electrical vehicle and electrically connected to the vehicle propulsion system of said electrical vehicle and electrically insulated from the vehicle structure, a current collecting member mounted on said base and provided with a spring constant sufficient to establish contacting relationship with respect to said rigid conductor at all times, and a load supporting member mounted on said base, independent of said current collecting member, and adapted to engage the rigid conductor upon contact under pressure of said rigid conductor with said load supporting member, said load supporting member being provided with a spring constant larger than the spring constant of said current collecting member, said current collecting member being adapted to project, at the current collecting surface thereof, an amount higher than said rigid conductor supporting surface of said load supporting member when said current collecting surface of said current collecting member is spaced from said rigid conductor, and being aligned, at said current collecting surface thereof, with said rigid conductor contacting surface of said load supporting member when said current collecting surface of said current collecting member is brought into contact under pressure with said rigid conductor, at least said load supporting member of part of said current collecting surface and said load supporting member being composed of material having high abrasion resistance with low friction.

3. A current collecting assembly as claimed in claim 2, wherein said current collecting member and said load supporting member are each mounted on said base through independent elastic members.

4. A current collecting assembly as claimed in claim 2, wherein said current collecting member includes a plurality of current collecting elements which are connected to each other by at least one leading conductive wire said current collecting elements being disposed in spaced relation with respect to each other in the direction of travel of the electrical vehicle so as to be independently mounted on said base through a resilient member.

5. A current collecting assembly as claimed in claim 2, wherein said load support member includes a plurality of load supporting elements disposed in spaced relation with respect to each other said current collecting member being disposed between said load supporting elements with said load supporting elements being mounted on said base through respective, independent resilient members, said resilient members having a spring constant higher than the spring constant of said current collecting member.

6. A current collecting assembly for receiving electrical power from a rigid electrical conductor and transferring said power to an electrical vehicle for the propulsion of said electrical vehicle which comprises at least two spaced-apart supporting members mounted on a base member, said base member adapted to be secured to the electrical vehicle and electrically connected to the vehicle propulsion system of said electrical vehicle and electrically insulated from the vehicle structure, at least one resiliently disposed electrical current collecting means provided between said supporting members, said electrical current collecting means being mounted on an elastic member which, in turn, is mounted on said base member, said electrical current collecting means being disposed slightly higher than the adjacent supporting members when the current collecting assembly is not in contact with the rigid electrical conductor, but said supporting members and said electrical current collecting means being adapted to maintain frictional engagement with the rigid electrical conductor during operation due to pressure contact with said rigid electrical conductor, said resiliently disposed, electrical current collecting means having a spring constant sufficient to maintain, at all operational times, contacting relationship with said rigid electrical conductor, and said load supporting members having a spring constant larger than that of the electrical current collecting means.

7. The current collecting assembly of claim 6, wherein a plurality of spaced-apart electrical current collecting means are provided between the supporting members.

8. The current collecting assembly of claim 7, wherein said plurality of electrical current collecting means are supported by a single elastic member.

9. The current collecting assembly of claim 8, wherein each elastic member comprises a L-shaped member attached to each lateral bottom end portion of each electrical current collecting means, a substantially U-shaped member centrally attached to the base member and elastic bodies being fixed to opposite sides of said U-shaped member and to the respective L-shaped members.

10. The current collecting assembly of claim 9, wherein a rubber sheet covered with a wire-netting is disposed between the lateral L-shaped members to suppress noise.

11. The current collecting assembly of claim 8, wherein each elastic member comprises opposing lateral resilient members disposed on each lateral side of the electrical current collecting means, said opposing lateral resilient members having an outwardly curved arc configuration which connects the electrical current collecting means with the base member, and an additional elastic body disposed between the adjacent lateral resilient members, said additional elastic body having a lower profile than said lateral resilient members and being adapted to operate as a second stage resilient member when the lateral resilient members are excessively displaced.

12. The current collecting assembly of claim 8, wherein each elastic member comprises opposing lateral resilient members disposed on each lateral side of the electrical circuit collecting means, said opposing lateral resilient members having an outwardly curved arc configuration which connects the electrical circuit collecting means with the base member, each of said lateral resilient members containing a pair of nipples which are positioned to contact each other when the lateral resilient members are inwardly compressed beyond a predetermined limit.

13. The current collecting assembly of claim 7, wherein said plurality of electrical current collecting means are supported by a plurality of respective elastic members.

14. The current collecting assembly of claim 7, wherein the elastic member has an upwardly curved profile so that the upper surface of said plurality of electrical current collecting means has a profile having its highest point at the longitudinal center of the electrical current collecting means.

15. The current collecting assembly of claim 7, wherein flexible lead wires are provided for connecting respective electrical current collecting means.

16. The current collecting assembly of claim 6, wherein electrical connecting means are provided for electrically connecting electrical current collecting means to the base member.

17. The current collecting assembly of claim 16, wherein said electrical connecting means is embedded in the elastic member.

18. The current collecting assembly of claim 6, wherein the base is made of an electrically conductive material.

19. The current collecting assembly of claim 6, wherein the supporting means is made of a material selected from the groups consisting of nylon, teflon, a polycarbonate, powder carbon, molybdenum disulfide filled nylon, molybdenum disulfide filled metallic compounds and said materials reinforced with metallic plate.

20. The current collecting assembly of claim 6, wherein elastic means are interposed between the supporting means and the base member.

* * * * *